United States Patent
Lun et al.

(10) Patent No.: US 7,414,978 B2
(45) Date of Patent: Aug. 19, 2008

(54) MINIMUM-COST ROUTING WITH NETWORK CODING

(75) Inventors: Desmond S. Lun, Cambridge, MA (US); Muriel Medard, Cambridge, MA (US); Tracey Ho, Champaign, IL (US); Ralf Koetter, Champaign, IL (US); Niranjan Ratnakar, Urbana, IL (US)

(73) Assignee: Massachusetts Institute of Technology, Cambridge, MA (US)

( * ) Notice: Subject to any disclaimer, the term of this patent is extended or adjusted under 35 U.S.C. 154(b) by 619 days.

(21) Appl. No.: 11/027,889

(22) Filed: Dec. 30, 2004

(65) Prior Publication Data

US 2006/0146716 A1 Jul. 6, 2006

(51) Int. Cl.
*H04B 7/00* (2006.01)

(52) U.S. Cl. .................. 370/238; 370/396; 370/390; 709/232

(58) Field of Classification Search .................. 370/238, 370/390, 396; 709/232
See application file for complete search history.

(56) References Cited

U.S. PATENT DOCUMENTS

| | | | |
|---|---|---|---|
| 5,596,719 A * | 1/1997 | Ramakrishnan et al. ..... | 709/241 |
| 6,762,997 B1 * | 7/2004 | Liu et al. ..................... | 370/238 |
| 7,020,086 B2 * | 3/2006 | Juttner et al. ............... | 370/238 |
| 7,035,937 B2 * | 4/2006 | Haas et al. ................... | 709/239 |
| 2004/0218536 A1 * | 11/2004 | Yasukawa et al. ........... | 370/238 |
| 2005/0010675 A1 * | 1/2005 | Jaggi et al. .................. | 709/232 |
| 2005/0152391 A1 * | 7/2005 | Effros et al. ................. | 370/432 |

OTHER PUBLICATIONS

Bertsekas et al.;"Relaxation Methods for Minimum Cost Network Flow Problems"; Oct. 1983; p. 2-62;☐☐☐Bertseka et al. ;"Relaxation Methods for Minimum Cost Ordinary and Generalized Network Flow Problems": Feb. 1988; JSTOR; pp. 93-106.*
Bertsekas et al.; "E-Relation and Auction Methods For Seperable Convex Cost Network Flow problems"; Apr. 1996; pp. 2-18. ☐☐☐Wu et al; "Network palnning in Wireless Ad hoc Network: A Cross-layer Approach"; Nov. 2003; p. 2-39.*
Wu et al. "Minimum-Energy Multicast in Mobile Ad hoc Networks using Network Coding"; Mar. 2004; p. 2-24. ☐☐☐Ashlswede et al; "Network Information Flow"; 2000; IEEE; pp. 1204-1216.*

(Continued)

*Primary Examiner*—Ricky Ngo
*Assistant Examiner*—DeWanda Samuel
(74) *Attorney, Agent, or Firm*—Chapin IP Law, LLC; Barry W. Chapin, Esq.

(57) ABSTRACT

A method and computer program product for performing minimum cost routing with network coding is presented. The method and system model a network as a directed graph. A cost per unit flow is associated with each link of the directed graph. A link capacity is associated with each link of the directed graph. A network code is then computed that sets up a routing connection that achieves an optimal cost using the cost per unit flow for each link of the directed graph and using the link capacity for each link of the directed graph.

24 Claims, 7 Drawing Sheets

OTHER PUBLICATIONS

Bertsekas et al.; "The Auction Algorithm: A Distributed Relaxation Method for the Assignment Problem": 1988; J.C. Baltzer A.G.; p. 105-120. Parsa et al.; "An Iterative Algorithm for Delay- Constrained Minimum-Cost Multicasting"; IEEE; pp. 461-473.*

Rudolf Ahlswede, et al., "Network Information Flow", IEEE Transactions on Information Theory, vol. 46, No. 4, Jul. 2000, pp. 1204-1216.

Ashwinder Ahluwalia, et al., "On the Complexity and Distributed Construction of Energy-Efficient Broadcast Trees in Static Ad Hoc Wireless Networks", In Proceedings. 2002 Conference on Information Sciences and Systems (CISS 2002), Mar. 2002, pp. 807-813.

Ning Cai, et al., "Secure Network Coding", In Proceedings, 2002 IEEE International Symposium on Information Theory, Jun. 30-Jul. 5, 2002, p. 323.

Philip A. Chou, et al., "Practical Network Coding", In Proceedings. 41st Annual Allerton Conference on Communication, Control and Computing, Oct. 2003, pp. 40-49.

Alan Demers, et al., "Epidemic Algorithms for Replicated Database Maintenance", In Proc. ACM Symposium on Principles of Distributed Computing, 1987, pp. 1-12.

Michelle Effros, "Distortion-Rate Bounds for Fixed-and Variable-Rate Multiresolution Source Codes", IEEE Transactions on Information Theory, vol. 45, No. 6, Sep. 1999, pp. 1887-1910.

Tracey Ho, et al., "On Randomized Network Coding", In Proc. 41st Annual Allerton Conference on Communication, Control and Computing, Oct. 2003, pp. 11-20.

Tracy Ho, et al., "Byzantine Modification Detection In Multicast Networks Using Randomized Network Coding", ISIT 2004, Chicago, USA, Jun. 27-Jul. 2, 2004, p. 144.

Tracey Ho, et al., "The Benefits of Coding Over Routing In A Randomized Setting", ISIT 2003, Yokohama, Japan, Jun. 29-Jul. 4, 2003, p. 442.

R. Karp, et al., "Randomized Rumor Spreading", In Proc. Foundations of Computer Science, 2000. pp. 565-574.

David Kempe, et al., "Protocols and Impossibility Results for Gossip-Based Communication Mechanisms", In Proc. 43rd IEEE Symposium on Foundations of Computer Science, 2002. pp. 471-480.

Ralf Koetter, et al., "An Algebraic Approach to Network Coding", IEEE/ACM Transactions on Networking, vol. 11, No. 5, Oct. 2003. pp. 782-795.

Kadaba Bharath-Kumar, et al., "Routing to Multiple Destinations in Computer Networks", IEEE Transactions on Communications, vol. Com-31, No. 3, Mar. 1983, pp. 343-351.

April Rasala Lehman, et al., "Complexity Classification of Network Information Flow Problems", In Proc. 41st Annual Allerton Conference on Communication, Control and Computing, Oct. 2003, pp. 9-10.

Muriel Medard, et al., "on Coding for Non-Multicast Networks", In Proc. 41st Annual Allerton Conference on Communication, Control and Computing, Oct. 2003, pp. 21-29.

S. Ramanathan, "Multicast Tree Generation in Networks With Asymmetric Links", IEEE/ACM Transactions on Networking, vol. 4, No. 4, Aug. 1996, pp. 558-568.

Tim Roughgarden, et al., "How Bad Is Selfish Routing?", Journal of the ACM, vol. 49, No. 2, Mar. 2002, pp. 236-259.

Scott Shenker, et al., "Pricing in Computer Networks: Reshaping the Research Agenda", Telecommunications Policy, vol. 20, No. 3, 1996, pp. 183-201.

Hanif D. Sherali, et al., "Recovery of Primal Solutions When Using Subgradient Optimization Methods to Solve Lagrangian Duals of Linear Programs", Operations Research Letters 19 (1996), pp. 105-113.

Luhua Song, et al., "Zero-Error Network Coding for Acyclic Networks", IEEE Transactions on Information Theory, vol. 49, No. 12, Dec. 2003, pp. 3129-3139.

Shuo-Yen Robert Li, et al, "Linear Network Coding", IEEE Transactions on Information Theory, vol. 49, No. 2, Feb. 2003, pp. 371-381.

Jeffrey E. Wieselthier, et al., "Energy-Aware Wireless Networking with Directional Antennas: The Case of Session-Based Broadcasting and Multicasting", IEEE Trans. On Mobile Computing, vol. 1, No. 3, Jul.-Sep. 2002, pp. 176-191.

Jeffrey E. Wieselthier, et al., "Energy-Efficient Broadcast and Multicast Trees in Wireless Networks", Mobile Networks and Applications 7, 2002, pp. 481-492.

Raymond W. Yeung, "Multilevel Diversity Coding with Distortion", IEEE Transactions on Information Theory, vol. 41, No. 2, Mar. 1995, pp. 412-422.

* cited by examiner

MINIMUM-COST ROUTING WITH NETWORK CODING

GOVERNMENT RIGHTS

This invention was made with government support awarded by the National Science Foundation under Grant No. CCR-0325496. The government has certain rights in the invention.

BACKGROUND

The selection of routes is an issue of utmost importance in data networks. Cost based routing strategies arise as a result of network performance optimization or through the incorporation of Quality of Service (QoS) requirements as part of the routing process. In such networks, routing is based on a cost-based scheme which admits an arriving request on a minimum cost route if the associated cost of the route does not exceed the cost of the request. A network may be modeled as a graph, wherein routers and switches are represented by nodes and physical links between the routers and switches are represented by edges. Each edge is assigned a cost associated with the cost of sending a packet across that link. The total cost of a path is the sum of the cost of the edges in the path. A determination is made regarding the least-cost path to use to route a packet across the network.

SUMMARY

Conventional mechanisms such as those explained above suffer from a variety of deficiencies. One such deficiency is that conventional frameworks assume that a network has limited-capacity links and considers whether or not a given set of connections (unicast or multicast) can be simultaneously established, but gives no consideration to the resources that are consumed as a result of communicating on the links. In addition, such a framework implicitly assumes a certain homogeneity in network traffic—the goal is to ensure that connections are established as long as the network has the capacity to accommodate them regardless of the type or purpose of the connections—which is frequently not the case. The most notable example is today's Internet, which not only carries different types of traffic, but is also used by a vastly heterogeneous group of end users with differing valuations of network service and performance. It has been variously proposed that such heterogeneous networks be priced, allowing for selfish decisions on the part of individual users or organizations such as internet service providers, such that some models allowing for selfish routing decisions based on the price of the links.

Embodiments of the invention significantly overcome such deficiencies and provide mechanisms and techniques that provide minimum-cost routing with network coding.

Network coding is applied in settings where there is a cost associated with network use. The determination of minimum-cost single multicast connections with network coding can be posed as a linear optimization equation that admits a distributed solution. In particular, the determination of minimum-energy multicast in wireless networks with omnidirectional antennas can be handled by a linear optimization equation with a distributed solution when network coding is used. In the case of multiple multicast connections, a linear optimization equation is produced that yields a solution of equal or less cost than any solution without network coding.

In a particular embodiment of a method for providing minimum cost routing with network coding includes modeling a network as a directed graph. A cost per unit flow is provided for each link of the directed graph. A link capacity is also provided for each link of the directed graph. A network code is computed that sets up a routing connection that achieves an optimal cost using the cost per unit flow for each link of the directed graph and using the link capacity for each link of the directed graph.

Other embodiments include a computer readable medium having computer readable code thereon for providing minimum cost routing with network coding. The medium includes instructions for modeling a network as a directed graph. The medium also includes instructions for associating a cost per unit flow for each link of the directed graph as well as instructions for associating a link capacity for each link of the directed graph. The medium further includes instructions for computing a network code that sets up a routing connection that achieves an optimal cost using the cost per unit flow for each link of the directed graph and using the link capacity for each link of the directed graph.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides minimum-cost routing with network coding as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing minimum-cost routing with network coding as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1A:
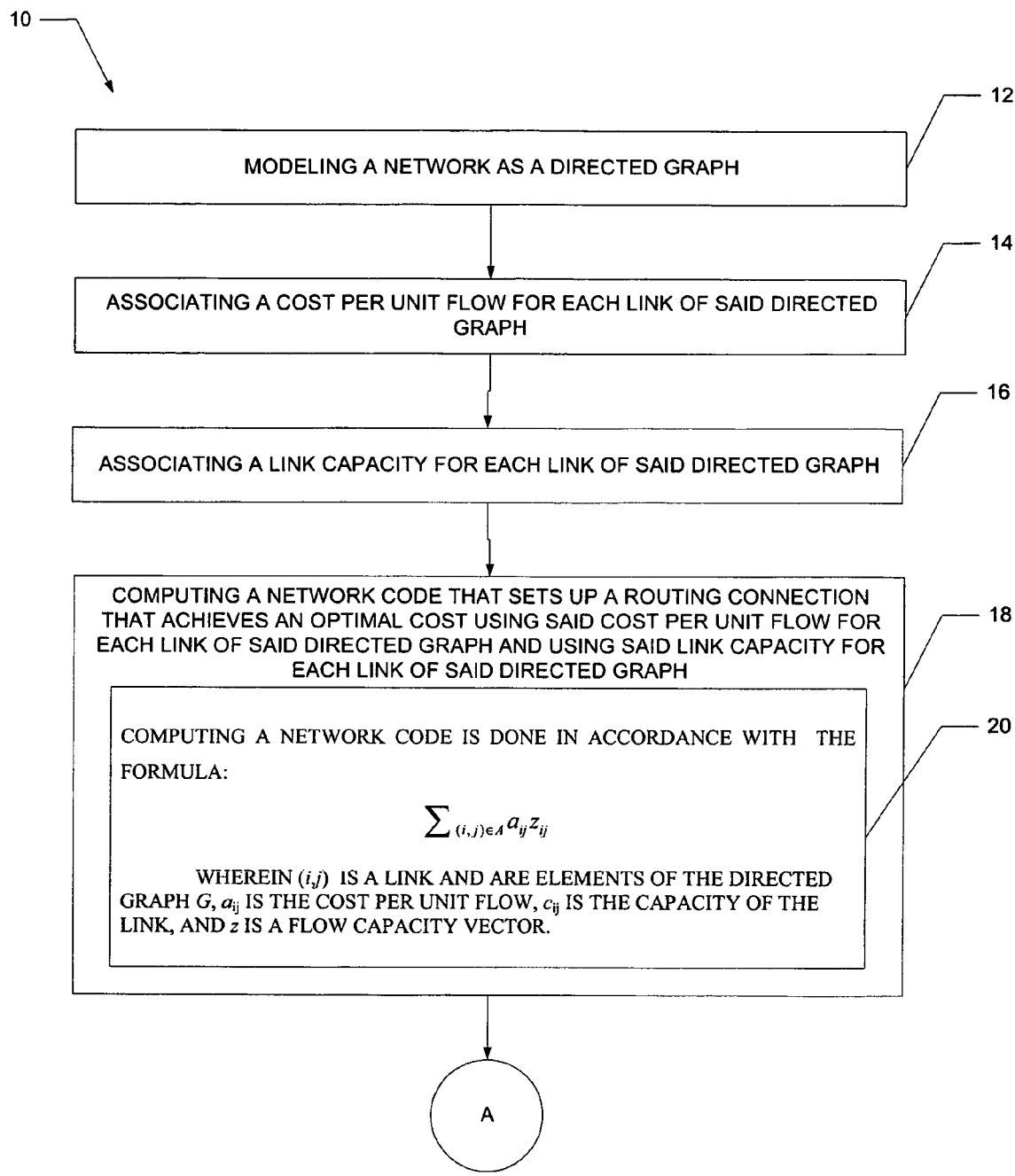
FIGS. 1A-1F comprise a flow diagram of a particular implementation of minimum-cost routing with network coding.
Figure 1B:
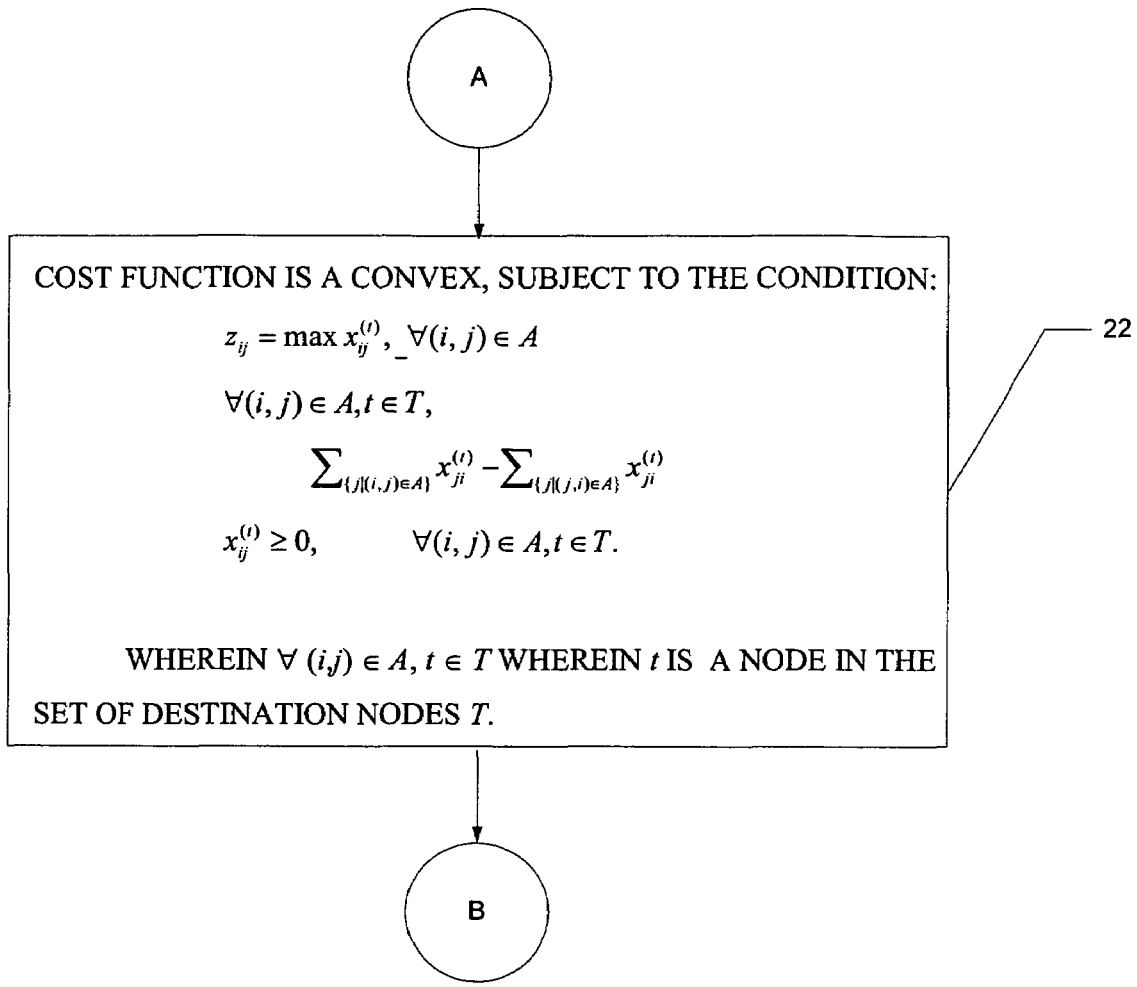
Figure 1C:
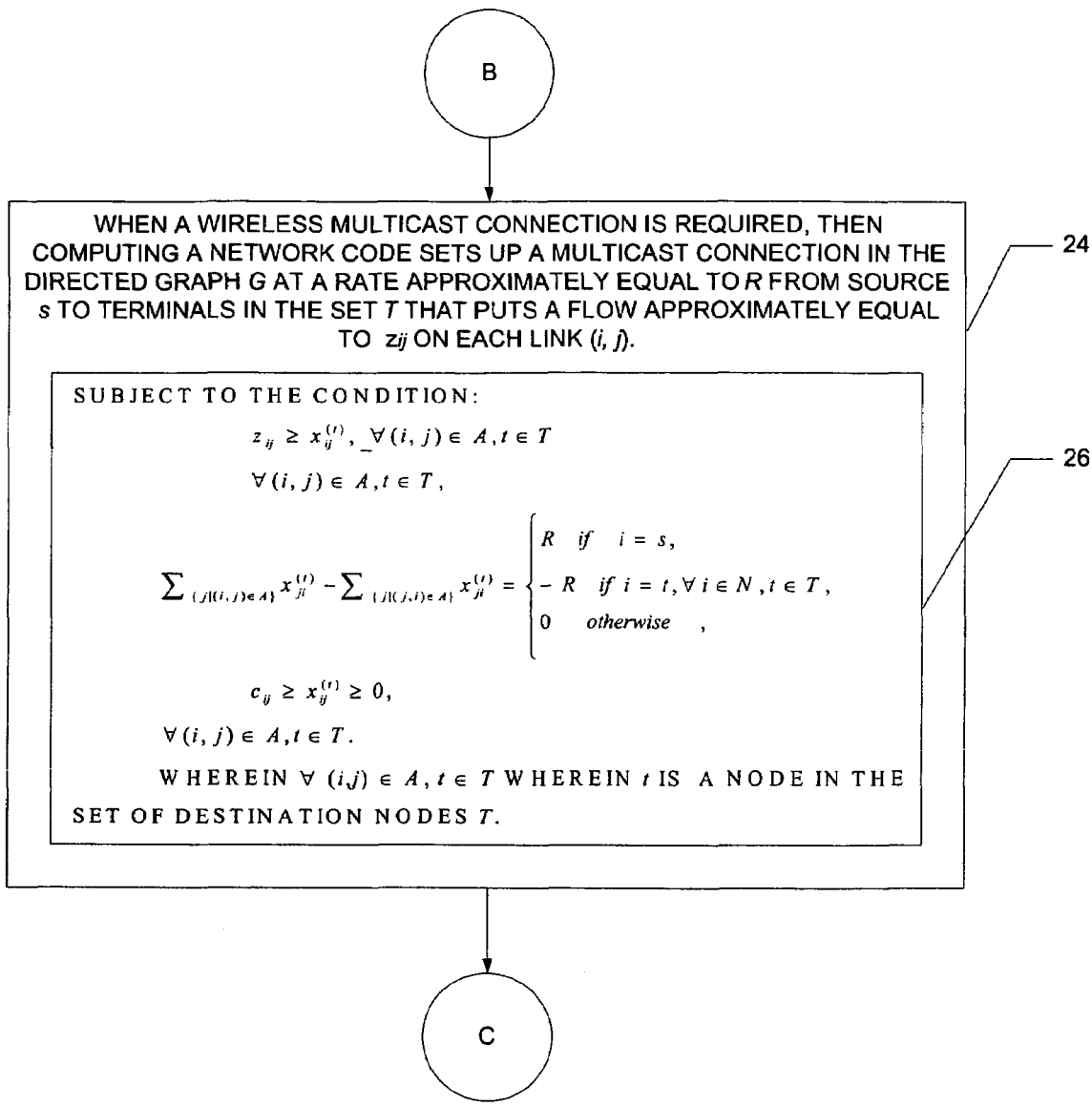
Figure 1D:
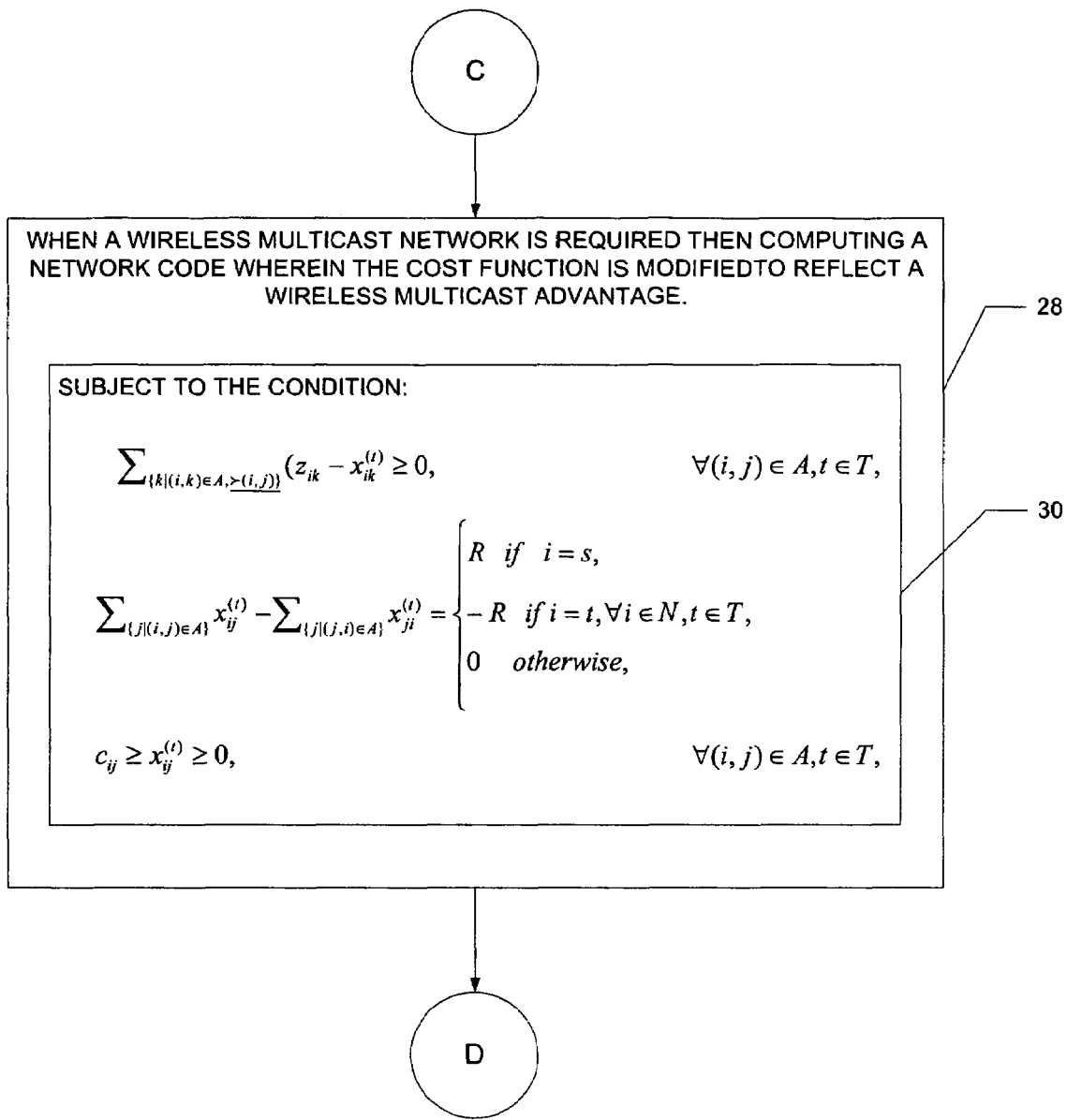
Figure 1E:
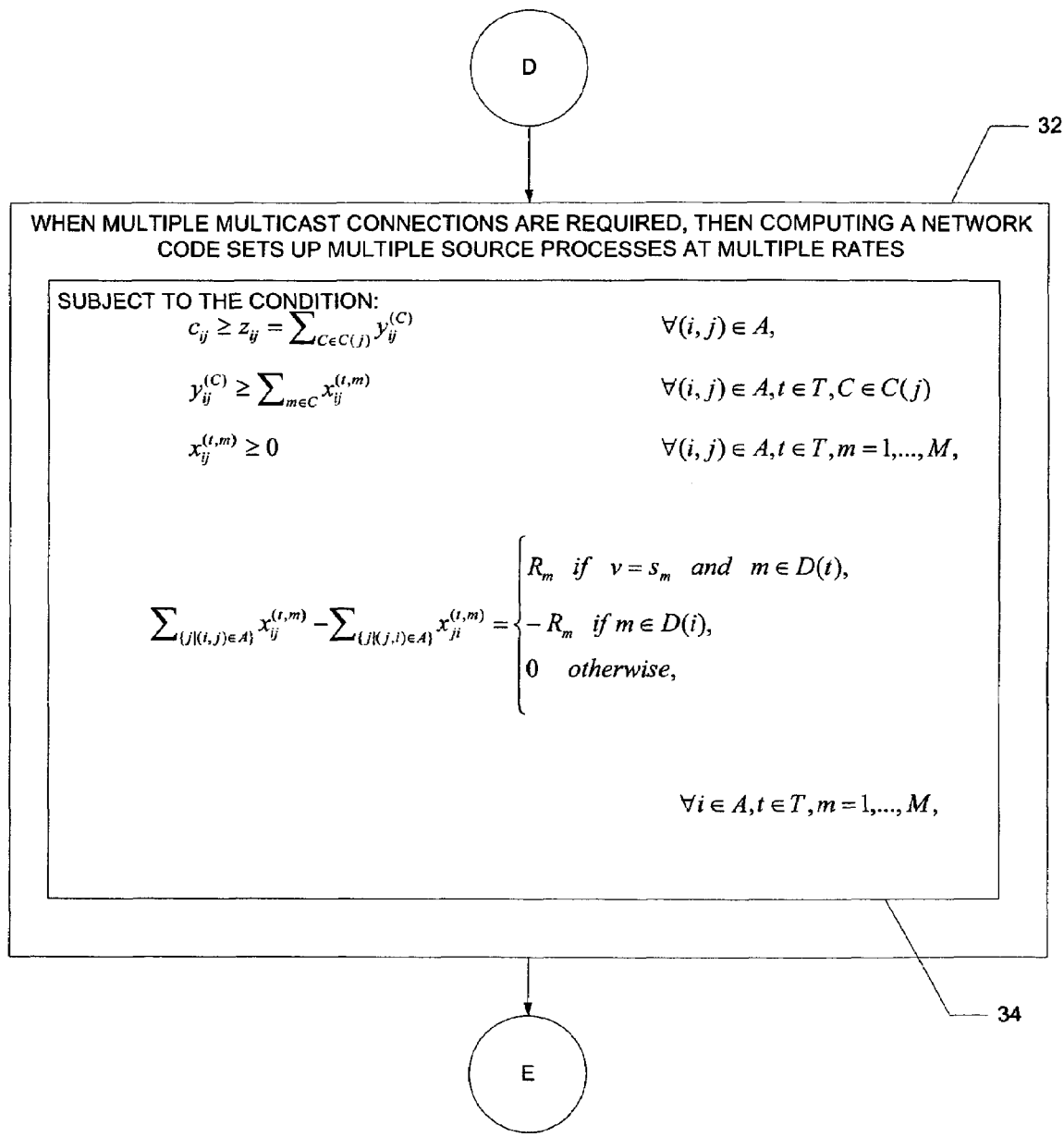
Figure 1F:
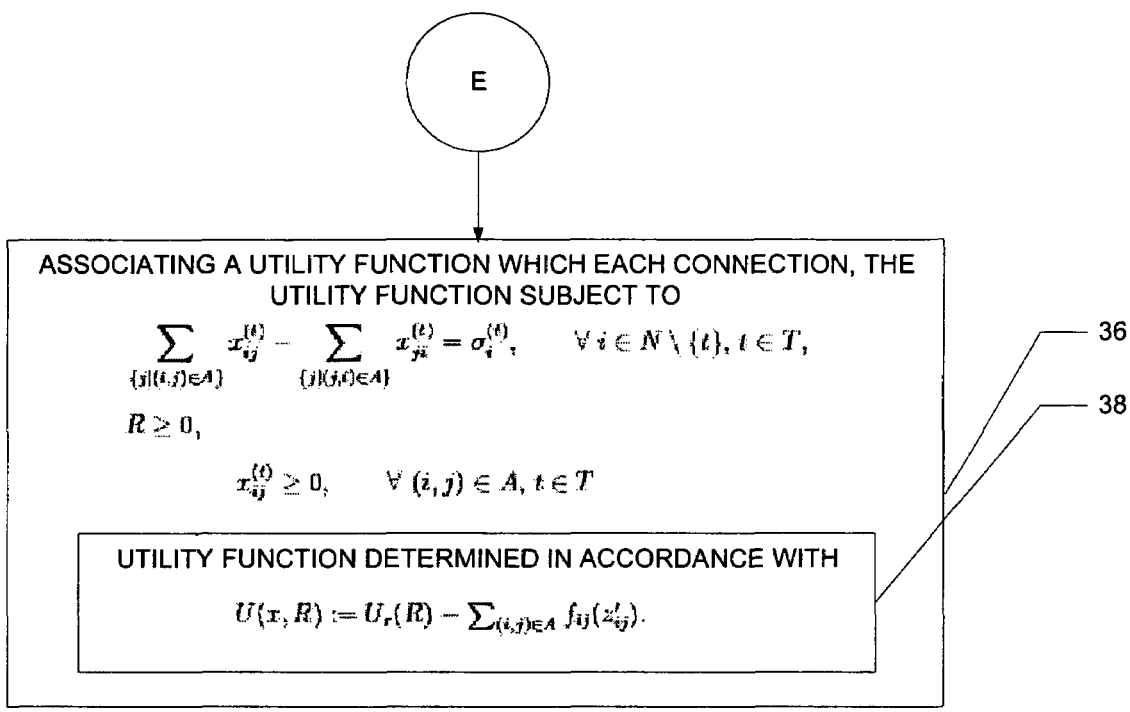

Network coding is utilized in settings where there is a cost associated with network use, in order to select routes for the allocation of flows that minimize the cost incurred. The first description of minimum cost routing using network coding deals with single multicast connections (which include single unicast connections as a special case). Whenever the members of a multicast group have a selfish cost objective, or when the network sets link weights to meet its objective or enforce certain policies and each multicast group is subject to a minimum-weight objective, it is desirable to set up single multicast connections at minimum cost. Network coding for single multicast connections is based on a characterization of feasibility in networks with limited-capacity links and, moreover, it suffices to consider linear operations over a sufficiently large finite field on a sufficiently long vector created from the source process.

The network is modeled with a directed graph $G=(N, A)$. Each link $(i,j)$ in A is associated with non-negative numbers $a_{ij}$ and $c_{ij}$, which are the cost per unit flow and the capacity of the link, respectively. The total cost of using a link is proportional to the flow on it. A source node s in N is producing data at a positive, real rate R that is to be transmitted to a non-empty set of terminal nodes T contained in N. This is defined by the following linear optimization equation:

$$\text{Minimize} \sum_{(i,j) \in A} a_{ij} z_{ij}$$

Subject to $z_{ij} \geq x_{ij}^{(t)}$, $\forall (i, j) \in A, t \in T$ $\forall (i, j) \in A, t \in T,$ $$\sum_{\{j|(i,j) \in A\}} x_{ji}^{(t)} - \sum_{\{j|(j,i) \in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$c_{ij} \geq x_{ij}^{(t)} \geq 0, \quad \forall (i,j) \in A, t \in T.$ (1)

The vector z is part of a feasible solution for the linear optimization equation if and only if there exists a network code that sets up a multicast connection in the graph G at a rate arbitrarily close to R from source s to terminals in the set T and that puts a flow arbitrarily close to $z_{ij}$ on each link $(i,j)$.

z is part of a feasible solution for the equation. Then, for any t in T, the maximum flow from s to t in the network where each link $(i,j)$ has capacity $z_{ij}$ is at least R. A network coding solution exists with flow arbitrarily close to $z_{ij}$ on each link $(i,j)$. Conversely, a network coding solution exists with flow arbitrarily close to $z_{ij}$ on each link $(i,j)$. The capacity of each link must be at least $z_{ij}$ and, moreover, flows of size R exist from s to t for each t in T. Therefore the vector z is part of a feasible solution for the optimization equation.

It also follows that the linear optimization equation finds the optimal cost for a rate R multicast connection from s to T in graph G that can be asymptotically achieved with a network code.

To establish a minimum-cost multicast with network coding, therefore, it suffices to solve the linear optimization equation and then compute a code that achieves the optimal cost within an arbitrary factor, which can be done systematically in time polynomial in |N|, |A|, and the block length of the code or, alternatively, in a random, distributed fashion. On the other hand, the standard approach for establishing a minimum-cost multicast without network coding requires solving a Steiner tree problem on directed graphs, which is known to be NP-complete (and which, moreover, only really applies when the links are of unlimited capacity). Although tractable approximation algorithms exist for the Steiner tree problem on directed graphs, the multicast routing solutions thus obtained are suboptimal relative to the minimum-cost multicast without network coding, which in turn is suboptimal relative to when network coding is used. Thus, network coding provides significant cost improvements for practical multicast routing.

In the special case of unicast, the linear optimization reduces to a minimum-cost flow equation and the solution of the equation leads to a fractional routing of flow over a number of paths, which is referred to as bifurcated routing. Although bifurcated routing is more complicated than single-path routing, it is also known to have better congestion properties; for example, it has been shown that bifurcated routing is essentially necessary if the "price of anarchy" is bound in a network where individual agents control a non-negligible amount of flow and route selfishly to minimize their individual latencies. Network coding facilitates the same natural extension to general multicast for bifurcated routing as that for single-path routing. Hence in a cost-efficient network that uses bifurcated routing and that services both unicast and multicast connections, network coding is a prerequisite.

Another advantage offered by network coding is that the linear optimization can be easily modified to accommodate convex cost functions, yielding a monotropic programming equation, or, if the cost functions are also piecewise-linear, reformulated into another linear optimization equation. When network coding is not used, it is not at all clear how any non-linear cost functions could be handled and, indeed, solving the Steiner tree problem on directed graphs no longer suffices to find the optimal solution.

Often, however, routing solutions are computed in a distributed manner based only on local information.

Towards the end of developing a distributed algorithm to solve equation (1), we consider the Lagrangian dual problem Maximize $$\sum_{t \in T} q^{(t)}(p^{(t)}) \tag{2}$$

Subject to $$\sum_{t \in T} p_{ij}^{(t)} = a_{ij} \; \forall (i,j) \in A,$$

$$p_{ij}^{(t)} \geq 0 \qquad \forall (i,j) \in A, t \in T,$$

where $$q^{(t)}(p^{(t)}) = \min_{x^{(t)} \in F^{(t)}} \sum_{(i,j) \in A} p_{ij}^{(t)} x_{ij}^{(t)}, \tag{3}$$

where $F^{(t)}$ is the bounded polyhedron of points $x^{(t)}$ satisfying the conservation of flow constraints $$\sum_{\{j|(i,j)\in A\}} x_{ij}^{(t)} - \sum_{\{j|(j,i)\in A\}} x_{ji}^{(t)} = \begin{cases} R & \text{if } i=s, \\ -R & \text{if } i=t, \\ 0 & \text{otherwise,} \end{cases} \forall i \in N \quad (4)$$

and capacity constraints $$0 \leq x_{ij}^{(t)} \leq c_{ij}, \forall (i,j) \in A. \quad (5)$$

Equation (3) is a standard linear minimum-cost flow equation, which can be solved in a plurality of ways. In particular the equation can be solved in an asynchronous, distributed manner using an ε-relaxation method.

In order to solve equation (2), subgradient optimization is employed. An iterate p[0] in the feasible set of (2) and, given an iterate p[n] for some non-negative integer n, equation (3) is solved for each t in T to obtain x[n]. Then $$p_{ij}[n+1] := \underset{v \in P_{ij}}{\arg\min} \sum_{t \in T} (v^{(t)} - (p_{ij}^{(t)}[n] + \theta[n]x_{ij}^{(t)}[n]))^2 \quad (6)$$

is assigned for each (i,j) ∈ A, where $P_{ij}$ is the |T|-dimensional simplex $$P_{ij} = \left\{ v \;\middle|\; \sum_{t \in T} v^{(t)} = a_{ij}, v \geq 0 \right\} \quad (7)$$

and θ[n]>0 is an appropriate step size. Thus, $p_{ij}[n+1]$ is set to be the Euclidean projection of $p_{ij}[n]+\theta[n]x_{ij}[n]$ onto $P_{ij}$.

To perform the projection, the following algorithm is used. Let $u:=p_{ij}[n]+\theta[n]x_{ij}[n]$ and suppose the elements of T are indexed such that $u^{(t_1)} \geq u^{(t_2)} \geq \ldots \geq u^{(t_{|T|})}$. k* is taken to be the smallest k such that $$\frac{1}{k}\left(a_{ij} - \sum_{r=1}^{t_K} u^{(r)}\right) \leq -u^{(t_{k+1})} \quad (8)$$

or set k*=|T| if no such k exists. Then the projection is achieved by $$p_{ij}^{(t)}[n+1] = \begin{cases} u^{(t)} + \frac{1}{k^*}\left(a_{ij} - \sum_{r=1}^{t_{k^*}} u^{(r)}\right) & \text{if } t \in \{t_1, \ldots, t_{k^*}\}, \\ 0 & \text{otherwise.} \end{cases} \quad (9)$$

The disadvantage of the subgradient optimization is that, while it yields good approximations of the optimal value of the Langrangian equation (2) after sufficient iteration, it does not necessarily yield a primal optimal solution. There are methods for recovering primal solutions in subgradient optimization.

Let $$\{\mu_l[n]\}_{l=1,\ldots n}$$

be a sequence of convex combination weights for each non-negative integer n, i.e. $\Sigma_{l=1}^n \mu_l[n]=1$ and $\mu_l[n] \geq 0$ for all $l=1,\ldots,n$. Further, define $$\gamma_{ln} := \frac{u_l[n]}{\theta[n]}, l=1,\ldots,n, n=0,1,\ldots, \quad (10)$$

and $$\Delta\gamma_n^{\max} := \max_{l=2,\ldots,n}\{\gamma_{ln} - \gamma_{(l-1)n}\}. \quad (11)$$

If the step sizes {θ[n]} and convex combination weights {$\mu_1[n]$} are chosen such that
1) γln ≥ γ(l−1)n for all l=2, ..., n and n=0, 1, ...,
2) $\Delta_{\gamma n}^{max} \to 0$ as n→∞, and
3) $\gamma_{1n} \to 0$ as n→∞ and $\gamma_{nn} \geq \delta$ for and all n=0,1, ... for some δ >0, then an optimal solution is obtained for the primal equation (1) from any accumulation point of the sequence of primal iterates {x̃[n]} given by $$\tilde{x}[n] := \sum_{l=1}^n \mu_l[n]x[l], n=0,1,\ldots \quad (12)$$

The required conditions on the step sizes and convex combination weights are satisfied by the following choices:
1) step sizes {θ[n]} such that $\theta[n] \geq 0$, $\lim_{n \to \infty}\theta[n]=0$, $\Sigma_{n=1}^\infty \theta_n = \infty$, and convex combination weights {$\mu_l[n]$} given by $\mu_l[n]=\theta[l]/\Sigma_{k=1}^n \theta[k]$ for all l=1, ..., n, n=0, 1, ...;
2) step sizes {θ[n]} given by θ[n]=a/(b+cn) for all n=0, 1, ..., where a>0, b≥0 and c>0, and convex combination weights {$\mu_l[n]$} given by $\mu_l[n]=1/n$ for all l=1, ..., n, n=0, 1, ...; and
3) step sizes {θ[n]} given by $\theta[n]=n^{-\alpha}$ for all n=0, 1, ..., where 0<α<1, and convex combination weights {$\mu_l[n]$} given by $\mu_l[n]=1/n$ for all l=1, ..., n, n=0, 1, ....

Moreover, for all three of the above choices, $\mu_l[n+1]/\mu_l[n]$ is independent of l for all n, therefore primal iterates can be computed iteratively using $$\bar{x}[n] = \sum_{l=1}^n \mu_l[n]x[l] \quad (13)$$
$$= \sum_{l=1}^n \mu_l[n]x[l] + \mu_n[n]x[n]$$
$$= \phi[n-1]\bar{x}[n-1] + \mu_n[n]x[n],$$

where $$\phi[n] := \mu_l[n+1]/\mu_l[n].$$

This provides optimal feasible solutions to equation (1) in a distributed manner, with computation taking place at each node, which needs only to be aware of the capacities and costs of its incoming and outgoing links. For example, for all links (i,j) in A, $p_{ij}^{(t)}[0]=a_{ij}/|T|$ can be set at both nodes i and j. Since each node has the capacities and costs of its incoming and outgoing links for subequation (3) for each $t \in T$, the $\epsilon$-relaxation method can be applied to obtain flows $x^{(t)}[0]$ for each $t \in T$, which is used to compute $p_{ij}[1]$ and $\tilde{x}_{ij}[0]$ at both nodes i and j using equations (6) and (12), respectively. The $\epsilon$-relaxation method is then reapplied and so on.

In the above description, the cost function is separable; that is, the cost can be assessed on a per link basis. There are, however, scenarios where this is not the case. One such scenario is where routing is done selfishly to minimize latency. In this case, it is desirable to minimize the latency of each member of the multicast group (known as a destination cost criterion) and, just as the solution for single-path routing is to compute the shortest path from the source to each terminal and route over the resulting tree, the solution for bifurcated routing is to compute the minimum-cost flow from the source to each terminal and network coding over the resulting "union" of flows. Whilst optimizing for destination cost criteria is very easy, it can potentially be very wasteful of network resources. There are scenarios still, where the cost is not even a function of the vector z as we have defined it in the first linear optimization, for example, that of energy-limited wireless networks.

In wireless networks, computing the energy cost is complicated by of the omnidirectionality of the antennas; so when transmitting from node i to node j, transmission is also made to all nodes whose distance from i is less than that from i to j "for free"—a phenomenon referred to as the "wireless multicast advantage" in. This phenomenon makes it harder to compute optimal multicast trees that even the problem of minimum-energy broadcast in wireless networks without network coding is NP-complete. In the formulation of minimum-cost routing with network coding, modifying the cost function to reflect the wireless multicast advantage poses no serious complication. Note that the optimizing is for energy usage, without regard for factors such as interference; thus, that the network is energy-limited in the sense that energy is the most significant constraint, and that there is, for example, sufficient bandwidth to avoid interference by frequency multiplexing.

i is a node in N. An ordering $\preceq$ is imposed on the set of outgoing links from i, such that $(i,j) \preceq (i,k)$ if and only if $a_{ij} \leq a_{ik}$. Typically, the set of outgoing links from i will be the set of all nodes within a certain, fixed radius of i and the cost $a_{ij}$ of the link between nodes i and j will be proportional to their distance raised to some power $\alpha$, where $\alpha \geq 2$.

As discussed above, a network coding solution with flow arbitrarily close to $z_{ij}$ on each link $(i,j) \in A$ exists if and only if we can accommodate flows $x_{(t)} \in F^{(t)}$ for all sinks t in T in the network where each link (i,j) has capacity $z_{ij}$. Consider a particular link (i,j). Owing to the omnidirectionality of the antennas, flow can be pushed from i to j by pushing it to any node k such that $(i,k) \in A$ and $(i,k) \succeq (i,j)$. and it follows that the maximum flow $x_{ij}^{(t)}$ that can be pushed for a given t in T is $$z_{ij} + \sum_{\{k|(i,k) \in A, (i,k) \succeq (i,j)\}/(j)} (z_{ik} - x_{ik}^{(t)}). \quad (14)$$

and $$\sum_{\{k|(i,k) \in A, (i,k) \succeq (i,j)\}} (z_{ik} - x_{ik}^{(t)}) \geq 0 \quad (15)$$

for all $t \in T$.

Thus, the relevant linear optimization equation that needs to be solved is the following.

$$\text{minimize} \sum_{(i,j) \in A} a_{ij} z_{ij} \quad (16)$$

$$\text{subject to} \sum_{\{k|(i,k) \in A, \succeq (i,j)\}} (z_{ik} - x_{ik}^{(t)}) \geq 0, \quad \forall (i,j) \in A', t \in T,$$

$$\sum_{\{j|(i,j) \in A\}} x_{ij}^{(t)} - \sum_{\{j|(j,i) \in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$$c_{ij} \geq x_{ij}^{(t)} \geq 0, \quad \forall (i,j) \in A, t \in T,$$

where A' is a subset of A with the property that the constraint (15) is unique for all $(i,j) \in A'$ (for example, if $(i,j_1)$ and $(i,j_2)$ are unique members of A such that $a_{ij_1}=a_{ij_2}$, then only one of the two is in A').

The linear optimization equation (16) can also be solved in a distributed manner much the same as that for equation (1). The relevant Lagrangian dual equation is $$\text{maximize} \sum_{t \in T} q^{(t)}(p^{(t)}) \quad (17)$$

$$\text{subject to} \sum_{t \in T} \sum_{\{k|(i,k) \in A', (i,k) \leq (i,j)\}} p_{ik}^{(t)} = a_{ij} \quad \forall (i,j) \in A,$$

$$p_{ij}^{(t)} \geq 0 \quad \forall (i,j) \in A, t \in T,$$

where (18)

$$q^{(t)}(p^{(t)}) = \min_{x^{(t)} \in F^{(t)}} \sum_{(i,j) \in A} \left( \sum_{\{k|(i,k) \in A', (i,k) \leq (i,j)\}} p_{ik}^{(t)} \right) x_{ij}^{(t)}.$$

equation(17) can be written as $$\text{maximize} \sum_{t \in T} q^{(t)}(p^{(t)}) \quad (19)$$

$$\text{subject to} \sum_{t \in T} p_{ij}^{(t)} = a_{ij} - \sum_{\{k|(i,k) \in A', (i,k) \leq (i,j)\}/\{j\}} a_{ij} \quad \forall (i,j) \in A',$$

$$p_{ij}^{(t)} \geq 0 \quad \forall (i,j) \in A, t \in T,$$

which has the same form as equation (2) and to which the same distributed solution method can be applied. One slight modification, however, is necessary: Rather than calculating the dual variable $p_{ij}[n]$ for each iteration at both nodes i and j, it is computed at node i only and the $\epsilon$-relaxation link cost $$\sum_{\{k|(i,k) \in A', \leq (i,j)\}} p_{ik}[n]$$

is sent to node j.

In a scenario where there are multiple multicast connections, rather than one source process at a single node, there are M source processes $X_1, \ldots, X_M$ with rates $R_1, \ldots, R_M$, respectively, which are generated at (possibly different) nodes $s_1, \ldots, sM$ in N. Each sink $t \in T$ demands a subset of the source process that are generated in the network, which are specified with the set $D(t) \subset \{1, \ldots M\}$. While the nodes $s_1, \ldots s_M$ can be different, they do need to be, and an important example where they are not is when a data source has been compressed by a multiresolution or successive refinement source code and is to be transmitted to users of the network with varying demands of quality.

Given a network with limited-capacity links, the problem of determining whether or not a set of multicast connections is feasible with network coding is considerably more difficult than the equivalent problem when there is only a single multicast connection. All that we currently have are rather cumbersome bounds on the feasible region. In addition, it is known that it is not sufficient to consider linear operations over a sufficiently large finite field on sufficiently long vectors created from the source process—non-linear functions may be necessary in general.

A linear optimization equation whose minimum cost is no greater than the minimum cost of any routing solution is presented. Feasible solutions correspond to network codes that perform linear operations on vectors created from the source processes. Some additional notation is used. For any node i, T(i) denote the sinks that are accessible from i.

$$T(i) = \{t \in T \mid \exists \text{ a forward path to } t \text{ from } i \text{ or } t = i\}, \quad (20)$$

and let C(i) denote the set of atoms of the algebra generated by $\{D(t)\}_{t \in T(i)}$ $$C(i) = \left\{ \bigcap_{t \in T(i)} C(t) \,\middle|\, \begin{array}{l} C(t) = D(t) \text{ or} \\ C(t) = \{1, \ldots, M\} \setminus D(t) \end{array} \right\} \setminus \{\emptyset\}. \quad (21)$$

In essence, what C(i) gives is a set partition of $\{1, \ldots, M\}$ that represents the sources that can be mixed (combined linearly) on links going into i. For a given $C \in C(i)$, the sinks that receive a source process in C by way of link (j,ii) either receive all the source processes in C or none at all. Hence, source processes in C can be mixed on link (j,i) as the sinks that receive the mixture will also receive the source processes (or mixtures thereof) necessary for decoding.

Consider the following linear optimization equation:

$$\text{Minimize} \sum_{(i,j) \in A} a_{ij} z_{ij}$$

subject to $$c_{ij} \geq z_{ij} = \sum_{C \in C(j)} y_{ij}^{(C)} \quad \forall (i,j) \in A,$$

$$y_{ij}^{(C)} \geq \sum_{m \in C} x_{ij}^{(t,m)} \quad \forall (i,j) \in A, t \in T, C \in C(j)$$

$$x_{ij}^{(t,m)} \geq 0 \quad \forall (i,j) \in A, t \in T, m = 1, \ldots, M,$$

$$\sum_{\{j \mid (i,j) \in A\}} x_{ij}^{(t,m)} - \sum_{\{j \mid (j,i) \in A\}} x_{ji}^{(t,m)} = \begin{cases} R_m & \text{if } v = s_m \text{ and } m \in D(t), \\ -R_m & \text{if } m \in D(i), \\ 0 & \text{otherwise,} \end{cases} \quad (22)$$

$$\forall i \in A, t \in T, m = 1, \ldots, M,$$

where we define $D(i) := 0$ for i in N\T. Again, the optimization equation can be easily modified to accommodate convex cost functions.

If the vector z is part of a feasible solution for the linear optimization equation (22), then there exists a network code that sets up multicast connections for $m=1, \ldots M$ at a rate arbitrarily close to $R_m$ from source $s_m$ to sinks in the set $\{t \in T \mid m \in D(t)\}$ and that puts a flow arbitrarily close to $z_{ij}$ on each link (ij).

z is part of a feasible solution. The case where $Ri = \ldots = R_M = 1$ is considered, and the underlying multicommodity flows $\{x^{(t,m)}\}$ are forward path flows of size one. In this case, the codes use are linear with symbols from a finite field F.

M nodes $i_1, \ldots, i_M$ are connected to nodes $s_1, \ldots, s_M$ respectively. Each link $(I_m, s_m)$ carries one unit of flow of commodity m for each of the sinks in the set $\{t \in T \mid m \in D(t)\}$. Associated with each link (i,j) is a set of global coding vectors $B(i,j) \subset F^M$. The set B(i,j) represents the symbols that are transmitted on link (i,j) as a linear function of the original source processes; thus we have $B(i_m, s_m) = \{[0^{m-1}, 1, 0^{M-m}]\}$ for $m=1, \ldots, M$ and the global coding vectors that are put out by a node on its outgoing links must be linear combinations of the ones it receives on its incoming links. Moreover, it is not difficult to see that the sink t can recover its demands D(t) if and only if $$\text{span}\left( \bigcup_{\{i \mid (i,t) \in A\}} B(i,t) \right) \supset \text{span}\left( \bigcup_{m \in D(t)} B(i_m, s_m) \right) \quad (23)$$

The nodes are stepped through in topological order, examining the outgoing links and defining global coding vectors on them. On each link (i,j), $B(i,j) = \bigcup_{C \in C(j)} B_C(i,j)$ can be written where the $B_C(i,j)$ are disjoint, and, if the flow variable $x_{ij}^{(t,m)} = 1$ then it is associated with global coding vectors in the set $B_C(i,j)$ for the unique $C \in CI(j)$ such that $m \in C$.

When a new global coding vector is defined, the following invariants are maintained:

1) For every sink $t \in T$, the set of most recently defined global coding vectors associated with each flow path $\{x^{(t,m)}\}_{m \in D(t)}$ forms a set of $|D(t)|$ global coding vectors $B_t$ with the property that span $(B_t) = \text{span}((\bigcup_{m \in D(t)} B(i_m, s_m))$.

2) The set of global coding vectors $B_C(i,j)$ has the property that $B_C(i,j) \subset \text{span}(\bigcup_{m \in C} B(i_m, s_m))$. Now, consider node i and link (i,j) and suppose that the invariants have been thus far satisfied. Let $C \in C(j)$, and define $x_{ij}^{(t,C)} := \sum_{m \in C} x_{ij}^{(t,m)}$ and $t^* := \arg\max_{t \in T} x_{ij}^{(t,C)}$. For all sinks in the set $S := \{t \in T \mid x_{ij}^{(t,C)} > 0\}$ there are global coding vectors associated with incoming flows of commodities $m \in C$ that must be replaced by global coding vectors in the set $B_C(i,j)$. First, as long as $|F| \geq |T|$, $x_{ij}^{(t^*,C)}$ valid global coding vectors can be found for $B_C(i,j)$ such that $\dim(\text{span}(B_t)) = (|D(t)|$ for all $t \in S$. Secondly, $T(i) \supset T(j)$; and, given $m \in C$, if C' is the unique element of C(i) such that $m \in C'$, then $C' \subset C$. Hence all the global coding vectors associated with incoming flows of commodities $m \in C$ are elements of $\text{span}(\bigcup_{m \in C} B(i_m, s_m))$, so it follows that $B_c(i,j)$, whose elements are linear combinations of these global coding vectors, is a subset of span($\cup_{m \in C} B(i_m, s_m)$). But, for $t \in S$, span($\cup_{m \in C} B(i_m, s_m)$) $\subset$ span($\cup_{m \in D(t)} B(i_m, s_m)$) since $C \subset D(t)$. Therefore, span($B_t$) $\subset$ span($\cup_{m \in D(t)} B(i_m, s_m)$) and, because of the dimensionality of span($B_t$), it follows that span($B_t$)=span($\cup_{m \in D(t)} B(i_m, s_m)$).

Sets of global coding vectors are defined for all $C \in C(j)$ and $$|B(i,j)| = \sum_{C \in C(j)} |B_C(i,j)| = \sum_{C \in C(j)} \max_{t \in T} \left\{ \sum_{m \in C} x_{ij}^{(t,m)} \right\} \quad (24)$$

It is evident that, upon stepping through the entire graph, equation (23) is satisfied and, since z forms part of the feasible solution, $Z_{ij} \geq |B(i,j)|$, so a flow arbitrarily close to $z_{ij}$ can be placed on each link (i,j).

In the general case, coding is done over time $n \geq 1$. The rate-$R_m$ source process $X_m$ is converted into $\lfloor nR_m \rfloor$ unit rate source processes $X_{m l i}, \ldots, X_{m, \lfloor nRm \rfloor}$. For a given $t \in T$ and $m \in \{1, \ldots, M\}$, consider the graph G with link capacities $\lceil nx_{ij}^{(t,m)} \rceil$. Since the minimum cut between $s_m$ and t in this graph must be at least $\lfloor nR_m \rfloor$, there exists an integer flow $x^{(t,m)}$ of size $\lfloor nR_m \rfloor$ from $s_m$ to t that satisfies $x^{(t,m)} \leq \lceil nx_{ij}^{(t,m)} \rceil$. Using a conformal decomposition, the flow $x^{(t,m)}$ can be decomposed into $\lfloor nR_m \rfloor$, forward path flows of size one for each of the source processes $X_{mli}, \ldots, X_{m, \lfloor nRm \rfloor}$. The general case has now been reduced to the special case where all the source processes are all of unit rate and the underlying multicommodity flows are forward path flows of size one. Therefore, using linear coding with symbols from a finite field, we have sets of global coding vectors on each link (i,j) with size satisfying $$|B(i,j)| \leq \sum_{C \in C(j)} \max_{t \in T} \left\{ \sum_{k \in C} \lceil nx_{ij}^{(t,m)} \rceil \right\} \quad (25)$$

The rate achieved by such coding is $\lceil nR_m \rceil/n$ which differs from $R_m$ by no more than 1/n, and the flow placed on each link (i,j) can be made as low as $|B(i,j)|/n$, which exceeds $z_{ij}$ by no more than M/n.. The desired result were obtained by taking n arbitrarily large.

In scenario involving strictly convex cost functions, $f_{ij}(z_{ij})$ is a strictly convex, monotone increasing function of $z_{ij}$. Linear cost are still considered by choosing $f_{ij}(z_{ij})=(a_{ij}z_{ij})^{1+\alpha}$ which is a strictly convex function for $\alpha>0$, and which approaches the linear cost function $a_{ij}z_{ij}$ as $\alpha$ approaches 0. Note, however, that the convergence time approaches $\infty$ as $\alpha$ approaches 0.

Note that $f_{ij}(z_{ij})=f_{ij}(\max_{t \in T} x_{ij}^{(t)})$ is a convex function of $x^{ij(t)}$ since a monotone increasing, convex function of a convex function is convex. Thus, it follows that equation (26) can be restated as the following convex problem.

$$\text{minimize} \sum_{(i,j) \in A} f_{ij}(z_{ij}) \quad (26)$$

$$\text{subject to } z_{ij} = \max_{t \in T} x_{ij}^{(t)}, \quad \forall (i,j) \in A,$$

$$\sum_{\{j|(i,j) \in A\}} x_{ij}^{(t)} - \sum_{\{j|(j,i) \in A\}} x_{ji}^{(t)} = \sigma_i^{(t)}, \quad \forall i \in N, t \in T,$$

$$x_{ij}^{(t)} \geq 0, \quad \forall (i,j) \in A, t \in T.$$

Note that the capacity constraints have been removed, since they can be enforced by making edges arbitrarily costly as their flows approach their respective capacities.

Since the function $z_{ij}(\max_{t \in T} x_{ij}^{(t)})$ is not a strictly convex function, this convex problem might admit multiple solutions with the same minimum cost. Further, $z_{ij}$ as a function of $\max_{t \in T} x_{ij}^{(t)}$ is not differentiable everywhere. These factors pose some problems for algorithm design. This problem is addressed by solving the following modification of equation (26).

$$\text{minimize} \sum_{(i,j) \in A} f_{ij}(z'_{ij}) \quad (27)$$

$$\text{subject to } z'_{ij} = \left( \sum_{t \in T} (x_{ij}^{(t)})^n \right)^{\frac{1}{n}}, \quad \forall (i,j) \in A,$$

$$\sum_{\{j|(i,j) \in A\}} x_{ij}^{(t)} - \sum_{\{j|(j,i) \in A\}} x_{ji}^{(t)} = \sigma_i^{(t)}, \quad \forall i \in N, t \in T,$$

$$x_{ij}^{(t)} \geq 0, \quad \forall (i,j) \in A, t \in T.$$

Since the function $z_{ij}=(\Sigma_{t \in T}(x_{ij}^{(t)})^n)^{1/n}$ is a strictly convex function, it follows that the above problem is a strictly convex function and admits a unique solution for any integer n>0. For n>0, $z_{ij} \geq z_{ij}$ and, as n approaches $\infty$, $z_{ij}$ approaches $z_{ij}$. In the sequel, we assume that n is large and we solve equation (27) using a decentralized algorithm. Since $z_{ij} \geq z_{ij}$, a network code with a usage of on each edge (i,j) exists for every n. This implies that we do not need to consider n as so for the results to hold. However, since we desire $z_{ij}$ to be close to $z_{ij}$, we need to pick a large value for n.

$$\text{Let } U(x) := -\sum_{(i,j) \in A} f_{ij} \left( \left( \sum_{t \in T} (x_{ij}^{(t)})^n \right)^{\frac{1}{n}} \right).$$

Then equation (42) can be restated as follows:

$$\text{maximize } U(x) \quad (28)$$

$$\text{subject to } \sum_{\{j|(i,j) \in A\}} x_{ij}^{(t)} - \sum_{\{j|(j,i) \in A\}} x_{ji}^{(t)} = \sigma_i^{(t)},$$

$$\forall i \in N, t \in T,$$

$$x_{ij}^{(t)} \geq 0, \quad \forall (i,j) \in A, t \in T.$$

The function $U(x)$ is a strictly concave function of x. This follows because $f_{ij}(\cdot)$ is a monotone increasing, strictly convex function and is a strictly convex function of $x_{ij}$ The Lagrangian for equation (28) is as follows:

$$L(x, p, \lambda) = U(x) - \quad (29)$$

$$\sum_{t \in T} \left\{ \sum_{i \in N} p_i^{(t)} \left( \sum_{\{j|(i,j) \in A\}} x_{ij}^{(t)} - \sum_{\{j|(j,i) \in A\}} x_{ji}^{(t)} = \sigma_i^{(t)} \right) - \sum_{(i,j) \in A} \lambda_{ij}^{(t)} x_{ij}^{(t)} \right\}.$$

Since $U(x)$ is a strictly concave function of x (by Lemma 1), there exist a unique minimizing solution for equation (43), say $\hat{x}$, and Lagrange multipliers, say $\hat{p}$ and $\hat{\lambda}$, which satisfy the following Karush-Kuhn-Tucker conditions.

$$\frac{\partial L(\hat{x}, \hat{p}, \hat{\lambda})}{\partial x_{ij}^{(t)}} = \left(\frac{\partial U(\hat{x})}{\partial x_{ij}^{(t)}} - (\hat{p}_i^{(t)} - \hat{p}_j^{(t)}) + \hat{\lambda}_{ij}^{(t)}\right) = 0, \quad (30)$$

$$\forall (i, j) \in A, t \in T,$$

$$\sum_{\{j|(i,j)\in A\}} \hat{x}_{ij}^{(t)} - \sum_{\{j|(j,i)\in A\}} \hat{x}_{ji}^{(t)} = \sigma_i^{(t)}, \quad \forall i \in N, t \in T, \quad (31)$$

$$\hat{x}_{ij}^{(t)} \geq 0 \; \forall (i, j) \in A, t \in T, \quad (32)$$

$$\hat{\lambda}_{ij}^{(t)} \geq 0 \; \forall (i, j) \in A, t \in T, \quad (33)$$

$$\hat{\lambda}_{ij}^{(t)} \hat{x}_{ij} = 0 \; \forall (i, j) \in A, t \in . \quad (34)$$

Let $(y)_x^+$ for $x \geq 0$ denote the following function of y:

$$(y)_x^+ = \begin{cases} y & \text{if } x > 0, \\ \max\{y, 0\} & \text{if } x \leq 0. \end{cases} \quad (35)$$

To solve equation (43) in a decentralized fashion, the following primal-dual algorithm is considered $$\dot{x}_{ij}^{(t)} = k_{ij}^{(t)}(x_{ij}^{t})\left(\frac{\partial U(x)}{\partial x_{ij}^{(t)}} - q_{ij}^{(t)} + \lambda_{ij}^{(t)}\right), \quad (36)$$

$$\dot{p}_i^{(t)} = h_i^{(t)}(p_i^{(t)})(y_i^{(t)} - \sigma_i^{(t)}), \quad (37)$$

$$\dot{\lambda}_{ij}^{(t)} = m_{ij}^{(t)}(\lambda_{ij}^{(t)})(-x_{ij}^{(t)})_{\lambda_{ij}^{(t)}}^+, \quad (38)$$

where $$q_{ij}^{(t)} := p_j^{(t)} - p_i^{(t)}, \quad (39)$$

$$y_i^{(t)} := \sum_{\{j|(i,j)\in A\}} \hat{x}_{ij}^{(t)} - \sum_{\{j|(j,i)\in A\}} \hat{x}_{ji}^{(t)}, \quad (40)$$

and $k_{ij}^{(t)}(x_{ij}^{(t)}) > 0$, $h_i^{(t)}(p_i^{(t)}) > 0$, and $m_{ij}^{(t)}(\lambda_{ij}^{(t)}) > 0$ are nondecreasing continuous functions of $x_{ij}^{(t)}$, $p_i^{(t)}$, and $\lambda_{ij}^{(t)}$ respectively.

The algorithm specified by Equations (36)-(40) is globally, asymptotically stable. The global, asymptotic stability of the algorithm implies that no matter what the initial choice of (x, p) is, the primal-dual algorithm will converge to the unique solution of equation (31). However, λ is chosen with nonnegative entries as the initial choice.

A processor is associated with each edge (i, j) and node i. In a typical setting where there is one processor at every node, the processor at a node is assigned to be its own processor as well as the processor for all its outgoing edges.

The processor for node i keeps track of the variables $\{p_i^{(t)}\}_{t \in T}$, while the processor for edge (i,j) keeps track of the variables and $\{\lambda_{ij}^{(t)}\}_{t \in T}$ and $\{x_{ij}^{(t)}\}_{t \in T}$. Note that for the actual construction of a network code, z' is needed. With this assumption, the algorithm is decentralized in the following sense:

a node processor needs only to exchange information with the processors for edges coming in or out of the node; and an edge processor needs only to exchange information with the processors for nodes that it is connected to.

By noting that $$\frac{\partial U(x)}{\partial x_{ij}^{(t)}} = -f_{ij}(z_{ij}')(x_{ij}^{(t)}/z_{ij}')^{n-1}$$

it can be seen from equations (51)-(53) that this is indeed the case.

Frequently, rather than demanding fixed rate connections, users are willing to forego some rate in return for lower cost. Such a scenario is typically modeled by associating a utility function with each connection that has the same units as the cost function. The objective, then, is to maximize utility minus cost.

The original equation is modified by associating a utility function Ur(R) with the source such that $U_r(R)$ is the utility derived by the source when R is the data rate. The function $U_r(R)$ is assumed to be a strictly concave, increasing function of R. Further, some constraints in the original problem are dropped by making the observation that the equality constraints at a terminal t, namely $$\sum_{\{j|(i,j)\in A\}} x_{ij}^{(t)} - \sum_{\{j|(j,i)\in A\}} x_{ji}^{(t)} = \sigma_i^{(t)} = -R, \quad (41)$$

follow from the constraints at the source and at the other nodes. The dropping of these constraints is crucial to the proof that the algorithm presented in the sequel is decentralized. Thus, in this setup, the problem addressed is as follows:

maximize $U(x, R)$ (42)

subject to $$\sum_{\{j|(i,j)\in A\}} x_{ij}^{(t)} - \sum_{\{j|(j,i)\in A\}} x_{ji}^{(t)} = \sigma_i^{(t)}, \quad \forall i \in N \setminus \{t\}, t \in T,$$

$$R \geq 0,$$

$$x_{ij}^{(t)} \geq 0, \quad \forall (i, j) \in A, t \in T,$$

where $$U(x, R) := U_r(R) - \sum_{(i,j)\in A} f_{ij}(z_{ij}')$$

This problem can be solved by the following primal-dual algorithm.

$$\dot{x}_{ij}^{(t)} = k_{ij}^{(t)}(x_{ij}^{t})\left(\frac{\partial U(x, R)}{\partial x_{ij}^{(t)}} - q_{ij}^{(t)} + \lambda_{ij}^{(t)}\right), \quad (43)$$

$$\dot{R} = k_R(R)\left(\frac{\partial U(x, R)}{\partial R} - q_R + \lambda_R\right), \quad (44)$$

-continued $$\dot{p}_i^{(t)} = h_i^{(t)}(p_i^{(t)})y_i^{(t)}, \quad (45)$$

$$\dot{\lambda}_{ij}^{(t)} = m_{ij}^{(t)}(\lambda_{ij}^{(t)})(-x_{ij}^{(t)})_{\lambda_{ij}^{(t)}}^+, \quad (46)$$

$$\dot{\lambda}_R = m_R(\lambda_R)(-R)_{\lambda_R}^+, \quad (47)$$

where $$q_{ij}^{(t)} := p_j^{(t)} - p_i^{(t)}, \quad (48)$$

$$q_R := -\sum_{t \in T} p_s^{(t)}, \quad (49)$$

$$y_i^{(t)} := \sum_{\{j|(i,j) \in A\}} \hat{x}_{ij}^{(t)} - \sum_{\{j|(j,i) \in A\}} \hat{x}_{ji}^{(t)} - \sigma_i^{(t)}. \quad (50)$$

It can be shown using similar arguments as those for Theorem 1 that this algorithm is globally, asymptotically stable.

In addition, by letting the source s keep track of the rate R, it can be seen that the algorithm is decentralized.

Decentralized algorithms that compute minimum-cost subgraphs for establishing multicast connections in networks that use coding has been discussed. These algorithms complement existing decentralized schemes for constructing network well, and they together form a fully decentralized approach for achieving minimum-cost multicast. The prevailing approach based on approximation algorithms for the directed Steiner tree problem, on the other hand, is suboptimal and generally assumes centralized computation with full network knowledge. Thus, the present approach is attractive for any network that services multicast connections, particularly networks such as overlay networks and multihop wireless networks, where legacy issues are not a significant obstacle. Additionally, extensions have been described beyond the basic problem of fixed-rate multicast in networks with directed point-to-point links, and the problem of minimum-energy multicast in wireless networks as well as the case of a concave utility function at the sender have been considered.

A flow chart of the presently disclosed method is depicted in FIGS. 1A-1E. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 1A-1E, a method 10 of providing minimum cost routing with network coding 10 begins with processing block 12 wherein a network is modeled as a directed graph G. The directed graph G is represented by the formula G=(N,A) wherein N is the set of nodes of the network and A is the set of links of the network.

In processing block 14, a cost per unit flow is provided for each link of the directed graph, and in processing block 16 a link capacity is provided for each link of the directed graph.

In processing block 18, a network code is computed that sets up a routing connection that achieves an optimal cost using the cost per unit flow for each link of the directed graph and using the link capacity for each link of the directed graph.

In processing block 20, the network code is computed in accordance with the formula:

$$\sum_{(i,j) \in A} a_{ij} z_{ij}$$

wherein (i,j) is a link and are elements of the directed graph G, $a_{ij}$ is the cost per unit flow, $c_{ij}$ is the capacity of the link, and z is a flow capacity vector.

In processing block 22, the cost function is convex, subject to the condition $$\text{minimize} \sum_{(i,j) \in A} f_{ij}(z_{ij})$$

$$\text{subject to } z_{ij} = \max_{t \in T} x_{ij}^{(t)}, \quad \forall (i, j) \in A,$$

$$\sum_{\{j|(i,j) \in A\}} x_{ij}^{(t)} - \sum_{\{j|(j,i) \in A\}} x_{ji}^{(t)} = \sigma_i^{(t)}, \quad \forall i \in N, t \in T,$$

$$x_{ij}^{(t)} \geq 0, \quad \forall (i, j) \in A, t \in T.$$

In processing block 24, computing a network code sets up a multicast connection in the directed graph G at a rate approximately equal to R from source s to terminals in the set T that puts a flow approximately equal to $z_{ij}$ on each link (i,j).

In processing block 26, $z_{ij}$ is subject to the condition:

$$z_{ij} \geq x_{ij}^{(t)}, \quad \forall (i, j) \in A, t \in T \qquad \forall (i, j) \in A, t \in T,$$

$$\sum_{\{j|(i,j) \in A\}} x_{ji}^{(t)} - \sum_{\{j|(j,i) \in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$$c_{ij} \geq x_{ij}^{(t)} \geq 0, \qquad \forall (i, j) \in A, t \in T.$$

wherein $\forall$ (i,j) ∈ A, t ∈ T wherein t is a node in the set of destination nodes T.

In processing block 28, the network comprises a wireless multicast network, wherein the cost function is modified to reflect a wireless multicast advantage. In processing block 30, the network code is subject to $$\sum_{\{k|(i,k) \in A, > (i,j)\}} (z_{ik} - x_{ik}^{(t)}) \geq 0, \qquad \forall (i, j) \in A, t \in T,$$

$$\sum_{\{j|(i,j) \in A\}} x_{ij}^{(t)} - \sum_{\{j|(j,i) \in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$$c_{ij} \geq x_{ij}^{(t)} \geq 0, \qquad \forall (i, j) \in A, t \in T,$$

In processing block 32, the network comprises a multiple multicast network having multiple source processes at multiple rates.

In processing block 34, the network code is subject to $$c_{ij} \geq z_{ij} = \sum_{C \in C(j)} y_{ij}^{(C)} \quad \forall \ (i, j) \in A,$$

$$y_{ij}^{(C)} \geq \sum_{m \in C} x_{ij}^{(t,m)} \quad \forall \ (i, j) \in A, t \in T, C \in C(j)$$

$$x_{ij}^{(t,m)} \geq 0 \quad \forall \ (i, j) \in A, t \in T, m = 1, \ldots, M,$$

$$\sum_{\{j|(i,j) \in A\}} x_{ij}^{(t,m)} - \sum_{\{j|(j,i) \in A\}} x_{ji}^{(t,m)} = \begin{cases} R_m & \text{if } v = s_m \text{ and } m \in D(t), \\ -R_m & \text{if } m \in D(i), \\ 0 & \text{otherwise,} \end{cases}$$

$$\forall \ i \in A, t \in T, m = 1, \ldots, M,$$

The network code sets up multicast connections for m=1, ..., M at a rate approximately equal to $R_m$ from source $s_m$ to terminals in the set {t ∈ T|m ∈ D(t)} that puts a flow approximately equal to $z_{ij}$ on each link (i,j).

In processing block 36, the method further comprises associating a utility function with each connection, $$\text{maximize} U(x, R)$$

$$\text{subject to} \sum_{\{j|(i,j) \in A\}} x_{ij}^{(t)} - \sum_{\{j|(j,i) \in A\}} x_{ji}^{(t)} = \sigma_i^{(t)}, \quad \forall \ i \in N \setminus \{t\}, t \in T,$$

$$R \geq 0,$$

$$x_{ij}^{(t)} \geq 0, \quad \forall \ (i, j) \in A, t \in T,$$

and in processing block 38, the utility function is determined in accordance with the formula $$U(x, R) := U_r(R) - \sum_{(i,j) \in A} \int_{ij} (z'_{ij}).$$

Figure 2:
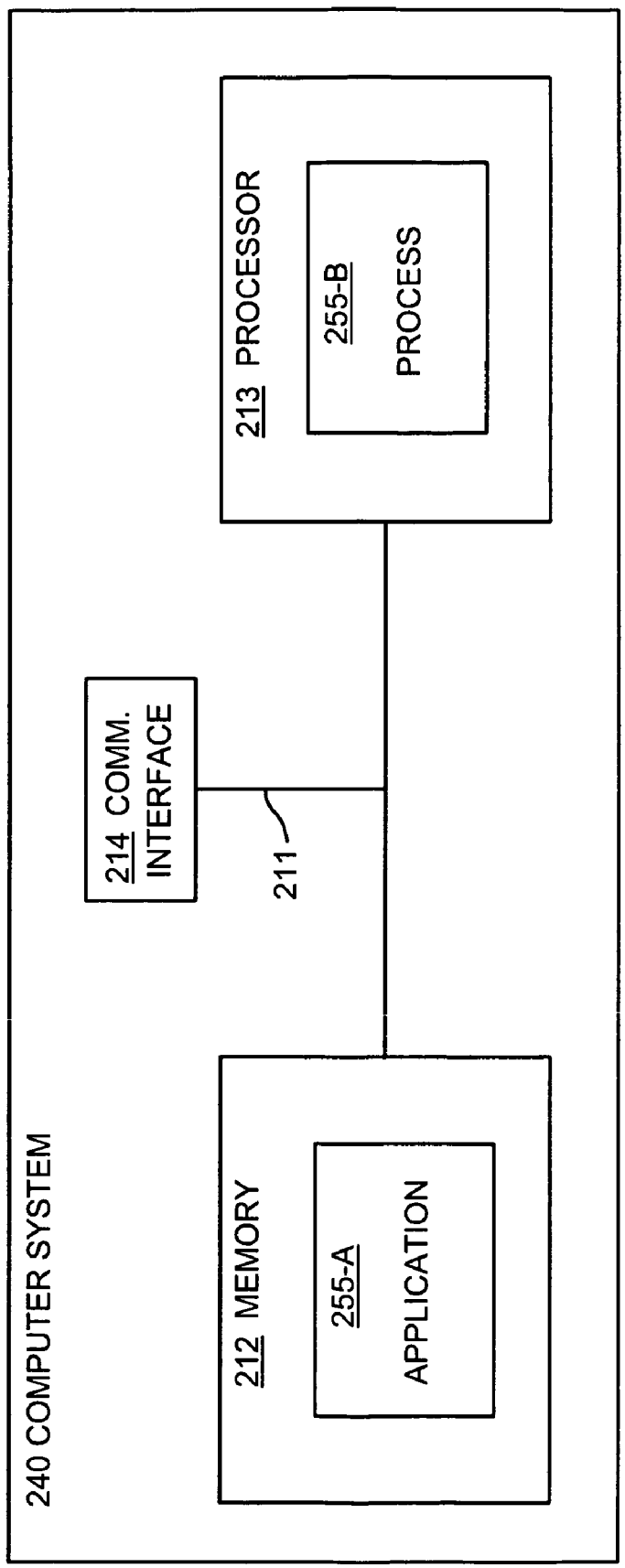
FIG. 2 illustrates an example computer system architecture for a computer system that performs minimum-cost routing with network coding in accordance with embodiments of the invention.

FIG. 2 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 2 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

By the way of the present invention, finding minimum-cost single multicast connections with network coding is posed as a linear optimization equation that admits a distributed solution. In the case of multiple multicast connections, a linear optimization equation that yields a solution of equal or less cost than any solution without network coding is provided.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing minimum cost routing with network coding comprising:
    modeling a network as a directed graph represented by the formula G =(N,A) wherein N is the set of nodes of the network and A is the set of links of the network;
    associating a cost per unit flow for each link of said directed graph;
    associating a link capacity for each link of said directed graph; and
    computing a network code that sets up a routing connection that achieves an optimal cost using said cost per unit flow for each link of said directed graph and using said link capacity for each link of said directed graph, wherein said computing a network code is done in accordance with the formula:

$$\sum_{(i,j) \in A} a_{ij} z_{ij}$$

wherein (i,j) is a link and are elements of the directed graph G, $a_{ij}$ is the cost per unit flow, $c_{ij}$ is the capacity of the link, and z is a flow capacity vector, and wherein said computing a network code sets up a multicast connection in said direction graph G at a rate approximately equal to R from source s to terminals in the set T that puts a flow approximately equal to $z_{ij}$ on each link (i,j).

2. The method of claim 1 wherein said network includes at least one single multicast connection.

3. The method of claim 1 wherein $z_{ij}$ is subject to the condition:

$$z_{ij} \geq x_{ij}^{(t)}, \_\forall \ (i,j) \in A, t \in T \qquad \forall (i,j) \in A, t \in T,$$

$$\sum_{\{j|(i,j)\in A\}} x_{ji}^{(t)} - \sum_{\{j|(j,i)\in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$$c_{ij} \geq x_{ij}^{(t)} \geq 0, \qquad \forall (i,j) \in A, t \in T.$$

wherein $\forall(ij) \in A$, $t \in T$ wherein t is a node in the set of destination nodes T.

4. The method of claim 1 wherein $z_{ij}$ is a convex cost function, subject to the condition:

$$z_{ij} = \max_{t \in T} x_{ij}^{(t)}, \qquad \forall (i,j) \in A,$$

$$\sum_{\{j|(i,j)\in A\}} x_{ij}^{(t)} - \sum_{\{j|(j,i)\in A\}} x_{ji}^{(t)} = \sigma_i^{(t)}, \qquad \forall i \in N, t \in T,$$

$$x_{ij}^{(t)} \geq 0, \qquad \forall (i,j) \in A, t \in T.$$

wherein $\forall(ij) \in A$, $t \in T$, and wherein t is a node in the set of destination nodes T.

5. The method of claim 1 wherein said network comprises a wireless multicast network and wherein the cost function is modified to reflect a wireless multicast advantage.

6. The method of claim 5 wherein said network code is subject to $$\sum_{\{k|(i,k)\in A, \geq (i,j)\}} (z_{ik} - x_{ik}^{(t)}) \geq 0, \qquad \forall (i,j) \in A, t \in T,$$

$$\sum_{\{j|(i,j)\in A\}} x_{ij}^{(t)} - \sum_{\{j|(j,i)\in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$$c_{ij} \geq x_{ij}^{(t)} \geq 0, \qquad \forall (i,j) \in A, t \in T,.$$

7. The method of claim 1 wherein said network comprises a multiple multicast network having multiple source processes at multiple rates.

8. The method of claim 7 wherein said network code is subject to $$c_{ij} \geq z_{ij} = \sum_{C \in C(j)} y_{ij}^{(C)} \quad \forall (i,j) \in A,$$

$$y_{ij}^{(C)} \geq \sum_{m \in C} x_{ij}^{(t,m)} \quad \forall (i,j) \in A, t \in T, C \in C(j)$$

$$x_{ij}^{(t,m)} \geq 0 \quad \forall (i,j) \in A, t \in T, m = 1, \ldots, M,$$

$$\sum_{\{j|(i,j)\in A\}} x_{ij}^{(t,m)} - \sum_{\{j|(j,i)\in A\}} x_{ji}^{(t,m)} = \begin{cases} R_m & \text{if } v = s_m \text{ and } m \in D(t), \\ -R_m & \text{if } m \in D(i), \\ 0 & \text{otherwise,} \end{cases}$$

$$\forall i \in A, t \in T, m = 1, \ldots, M.$$

9. The method of claim 8 wherein said network code sets up multicast connections for m=1, ..., M at a rate approximately equal to $R_m$ from source $s_m$ to terminals in the set $\{t \in T | m \in D(t)\}$ that puts a flow approximately equal to $z_{ij}$ on each link (i,j).

10. The method of claim 1 further comprising associating a utility function $U_r(R)$ with each connection that has the same units as the cost function, said utility function subject to $$\sum_{\{j|(i,j)\in A\}} x_{ij}^{(t)} - \sum_{\{j|(j,i)\in A\}} x_{ji}^{(t)} = \sigma_i^{(t)},$$

$$\forall i \in N \setminus \{t\}, t \in T, R \geq 0(,$$

$$x_{ij}^{(t)} \geq 0, \forall (i,j) \in A, t \in T.$$

11. The method of claim 10 wherein said utility function is determined in accordance with the formula:

$$U(x, R) := U_r(R) - \sum_{(i,j) \in A} f_{ij}(z'_{ij}).$$

12. A computer readable storage medium having encoded computer readable code thereon for providing minimum cost routing with network coding, the medium comprising:

instructions for modeling a network as a directed graph represented by the formula G=(N,A) wherein N is the set of nodes of the network and A is the set of links of the network;

instructions for associating a cost per unit flow for each link of said directed graph;

instructions for associating a link capacity for each link of said directed graph; and instructions for computing a network code that sets up a routing connection that achieves an optimal cost using said cost per unit flow for each link of said directed graph and using said link capacity for each link of said directed graph, wherein said computing a network code is done in accordance with the formula:

$$\sum_{(i,j) \in A} a_{ij} z_{ij}$$

wherein (i,j) is a link and are elements of the directed graph G, $a_{ij}$ is the cost per unit flow, $c_{ij}$ is the capacity of the link, and z is a flow capacity vector, and wherein said computing a network code sets up a multicast connection in said direction graph G at a rate approximately equal to R from source s to terminals in the set T that puts a flow approximately equal to $z_{ij}$ on each link (i,j).

13. The computer readable storage medium of claim 12 wherein said instructions for modeling a network comprises instructions for modeling a network including at least one single multicast connection.

14. The computer readable storage medium of claim 12 wherein said instructions for putting flow on each link further comprises instructions for putting flow $z_{ij}$ on each link is subject to the condition:

$$z_{ij} \geq x_{ij}^{(t)}, \quad \forall (i,j) \in A, t \in T \quad \forall (i,j) \in A, t \in T,$$

$$\sum_{\{j|(i,j)\in A\}} x_{ji}^{(t)} - \sum_{\{j|(j,i)\in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$$c_{ij} \geq x_{ij}^{(t)} \geq 0, \quad \forall (i,j) \in A, t \in T.$$

wherein $\forall (ij) \in A$, $t \in T$ wherein t is a node in the set of destination nodes T.

15. The computer readable storage medium of claim 12 instructions for putting flow on each link further comprises instructions for putting flow $z_{ij}$ on each link wherein the cost function is a convex, subject to the condition:

$$z_{ij} = \max_{i \in T} x_{ij}^{(t)}, \quad \forall (i,j) \in A,$$

$$\sum_{\{j|(i,j)\in A\}} x_{ij}^{(t)} - \sum_{\{j|(j,i)\in A\}} x_{ji}^{(t)} = \sigma_i^{(t)}, \quad \forall i \in N, t \varepsilon T,$$

$$x_{ij}^{(t)} \geq 0, \quad \forall (i,j) \in A, t \in T.$$

wherein $\forall (ij) \in A$, $t \in T$, and wherein t is a node in the set of destination nodes T.

16. The computer readable storage medium of claim 12 wherein said network comprises a wireless multicast network and wherein the instructions for associating a cost per unit flow for each link includes instructions to reflect a wireless multicast advantage.

17. The computer readable storage medium of claim 16 wherein said instructions for computing a network code is subject to $$\sum_{\{k|(i,k)\in A, >(i,j)\}} (z_{ik} - x_{ik}^{(t)}) \geq 0, \quad \forall (i,j) \in A, t \in T,$$

$$\sum_{\{j|(i,j)\in A\}} x_{ij}^{(t)} - \sum_{\{j|(j,i)\in A\}} x_{ji}^{(t)} = \begin{cases} R & \text{if } i = s, \\ -R & \text{if } i = t, \forall i \in N, t \in T, \\ 0 & \text{otherwise,} \end{cases}$$

$$c_{ij} \geq x_{ij}^{(t)} \geq 0, \quad \forall (i,j) \in A, t \in T,.$$

18. The computer readable storage medium of claim 12 wherein said network comprises a multiple multicast network having multiple source processes at multiple rates.

19. The computer readable storage medium of claim 14 wherein said instructions for computing a network code is subject to $$c_{ij} \geq z_{ij} = \sum_{C \in C(j)} y_{ij}^{(C)} \quad \forall (i,j) \in A,$$

-continued $$y_{ij}^{(C)} \geq \sum_{m \in C} x_{ij}^{(t,m)} \quad \forall (i,j) \in A, t \in T, C \in C(j)$$

$$x_{ij}^{(t,m)} \geq 0 \quad \forall (i,j) \in A, t \in T, m = 1, \ldots, M,$$

$$\sum_{\{j|(i,j)\in A\}} x_{ij}^{(t,m)} - \sum_{\{j|(j,i)\in A\}} x_{ji}^{(t,m)} = \begin{cases} R_m & \text{if } v = s_m \text{ and } m \in D(t), \\ -R_m & \text{if } m \in D(i), \\ 0 & \text{otherwise,} \end{cases}$$

$$\forall i \in A, t \in T, m = 1, \ldots, M,.$$

20. The computer readable storage medium of claim 16 wherein said instructions for computing a network code includes instructions for setting up multicast connections for m=1, . . . , M at a rate approximately equal to $R_m$ from source $s_m$ to terminals in the set $\{t \in T| m \in D(t)$ that puts a flow approximately equal to $z_{ij}$ on each link (i,j).

21. The computer readable storage medium of claim 12 further comprising instructions for associating a utility function $U_r(R)$ with each connection that has the same units as the cost function, said utility function subject to $$\sum_{\{j|(i,j)\in A\}} x_{ij}^{(t)} - \sum_{\{j|(j,i)\in A\}} x_{ji}^{(t)} = \sigma_i^{(t)},$$

$$\forall i \in N \setminus \{t\}, t \in T, R \geq 0,$$

$$x_{ij}^{(t)} \geq 0, \quad \forall (i,j) \in A, t \in T.$$

22. The computer readable medium of claim 21 further comprising instructions for defining said utility function in accordance with the formula:

$$U(x, R) := U_r(R) - \sum_{(i,j)\in A} f_{ij}(z_{ij}).$$

23. A method of providing minimum cost routing with network coding comprising:
modeling a network as a directed graph represented by the formula G=(N,A) wherein N is the set of nodes of the network and A is the set of links of the network;
associating a cost per unit flow for each link of said directed graph;
associating a link capacity for each link of said directed graph; and computing a network code that sets up a routing connection that achieves an optimal cost using said cost per unit flow for each link of said directed graph and using said link capacity for each link of said directed graph, wherein said computing a network code is done in accordance with the formula:

$$\text{minimize} \sum_{(i,j)\in A} f_{ij}(z_{ij})$$

$$\text{subject to } z_{ij} = \max_{t\in T} x_{ij}^{(t)}, \quad \forall (i,j) \in A,$$

$$\sum_{\{j|(i,j)\in A\}} x_{ij}^{(t)} - \sum_{\{j|(j,i)\in A\}} x_{ji}^{(t)} = \sigma_i^{(t)}, \quad \forall i \in N, \; t \in T, \; x_{ij}^{(t)} \geq 0,$$

$$\forall (i,j) \in A, \; t \in T.$$

wherein $\forall(ij) \in A$, $t \in T$, and wherein t is a node in the set of destination nodes T.

24. A computer readable storage medium having computer readable code thereon for providing minimum cost routing with network coding, the medium comprising:
- instructions for modeling a network as a directed graph represented by the formula G=(N,A) wherein N is the set of nodes of the network and A is the set of links of the network;
- instructions for associating a cost per unit flow for each link of said directed graph;
- instructions for associating a link capacity for each link of said directed graph; and
- instructions for computing a network code that sets up a routing connection that achieves an optimal cost using said cost per unit flow for each link of said directed graph and using said link capacity for each link of said directed graph, wherein said computing a network code is done in accordance with the formula:

$$\text{minimize} \sum_{(i,j) \in A} f_{ij}(z_{ij})$$

$$\text{subject to } z_{ij} = \max_{t \in T} x_{ij}^{(t)}, \quad \forall\, (i,j) \in A,$$

$$\sum_{\{j|(i,j) \in A\}} x_{ij}^{(t)} - \sum_{\{j|(j,i) \in A\}} x_{ji}^{(t)} = \sigma_i^{(t)}, \quad \forall\, i \in N, \quad t \in T, \quad x_{ij}^{(t)} \geq 0,$$

$$\forall\, (i,j) \in A, \quad t \in T.$$

wherein $\forall(ij) \in A$, $t \,\forall\, T$, and wherein t is a node in the set of destination nodes T.

* * * * *